United States Patent
Balbi

(10) Patent No.: US 6,681,105 B1
(45) Date of Patent: Jan. 20, 2004

(54) MOBILE RADIOTELEPHONE METHOD AND SYSTEM AND TERMINAL USED IN SUCH A SYSTEM

(75) Inventor: Dominique Balbi, Bois-Colombes (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/403,698

(22) PCT Filed: Apr. 23, 1998

(86) PCT No.: PCT/FR98/00810

§ 371 (c)(1),
(2), (4) Date: Dec. 23, 1999

(87) PCT Pub. No.: WO98/49827

PCT Pub. Date: Nov. 5, 1998

(30) Foreign Application Priority Data

Apr. 25, 1997 (FR) .............................................. 97 05144

(51) Int. Cl.[7] .............................................. H04M 11/00
(52) U.S. Cl. ...................... 455/406; 455/407; 455/408; 455/410; 379/144
(58) Field of Search ................. 455/406, 410, 455/407, 418, 408, 404, 564; 379/144

(56) References Cited

U.S. PATENT DOCUMENTS

| 4,756,020 | A | * | 7/1988 | Fodale ....................... 379/112 |
| 4,860,341 | A | * | 8/1989 | D'Avello et al. ............. 379/91 |
| 5,542,100 | A | * | 7/1996 | Hatakeyama ............ 455/404.2 |
| 5,982,866 | A | * | 11/1999 | Kowalski .................... 379/127 |
| 6,035,217 | A | * | 3/2000 | Kravitz ........................ 455/561 |
| 6,058,300 | A | * | 5/2000 | Hanson ...................... 455/406 |
| 6,064,875 | A | * | 5/2000 | Morgan ....................... 455/410 |
| 6,088,431 | A | * | 7/2000 | Ladue ......................... 379/114 |
| 6,188,751 | B1 | * | 2/2001 | Scherer .................. 379/88.22 |
| 6,198,915 | B1 | * | 3/2001 | McGregor et al. .......... 455/406 |
| 6,263,056 | B1 | * | 7/2001 | Gruchala et al. ........... 379/114 |
| 6,349,212 | B1 | * | 2/2002 | Martensson et al. ........ 455/462 |
| 6,553,115 | B1 | * | 4/2003 | Mashinsky ............. 379/355.01 |

* cited by examiner

*Primary Examiner*—Vivian Chin
*Assistant Examiner*—Marceau Milord
(74) *Attorney, Agent, or Firm*—Larson & Taylor PLC

(57) ABSTRACT

The method implements mobile terminals and an operating infrastructure having at least one call center, each portable terminal being given a credit of telephone charging units that is determined before said terminals are purchased, and each having means for calling a single call center. On the first occasion a call is made from a terminal, the terminal transmits an identifier to the single call center and the call center transmits a temporary subscriber number to the terminal, thereby enabling said terminal to be called via the network, and said number is stored in the call center.

11 Claims, 1 Drawing Sheet

MOBILE RADIOTELEPHONE METHOD AND SYSTEM AND TERMINAL USED IN SUCH A SYSTEM

BACKGROUND OF THE INVENTION

The invention relates to telephony by means of mobile terminals and a network operating infrastructure which is generally fixed but which could also include relaying via satellites in low orbit. A particularly important, although non-exclusive application of the invention lies in digital telephony.

Existing systems for digital cellular telephony, such as GSM and DECT 1800, comprise a network of base stations capable of communicating with one another and with mobile terminals, and the structure of such a network is complex for reasons of confidentiality, of international use, and of transmission security. Such systems require a potential user to deal with a limited number of points of sale and to take out a subscription that binds the user for a period of time that is generally long and that comes to an end only on deliberate termination. These constraints dissuade many people who need a mobile telephone only for very short periods of time, during which it is unusual for them to occupy locations that are very far apart from one another. The same drawback exists for other cellular networks and remains even when implementing the UMTS standard.

The sale of smart cards for inserting into a standardized terminal and containing a fixed number of prepaid telephone charging units provides a solution that is effective in part only, since the user must still have available a standard terminal that is complex. In addition, the introduction of such cards has increased the number of thefts of terminals.

Discardable cellular telephones are also known (WO-A-96/03001).

SUMMARY OF THE INVENTION

The invention seeks essentially to provide a method and a system for mobile radio telephony that gives immediate access to the network on purchase of a terminal, that is of low cost, and that allows telephone calls to be made during a limited length of time only, while being comparable in convenience to a complex cellular telephone, and without requiring a public telephone to be found.

To this end, the invention proposes in particular a radio telephony method implementing a network having at least one call center and portable terminals each given a predetermined credit of telephone charging units and each having fixed means for calling a single center, in which method, on the first occasion a call is made from a terminal, the terminal transmits an identifier to the single call center and the call center transmits a temporary subscriber number to the terminal, thereby enabling said terminal to be called via the network, and said number is stored in the call center.

On each call from the terminal, the debit is incremented and is compared with the credit, or is debited from the credit. When credit has been exhausted, calls from the terminal are rejected and/or the terminal is invalidated, and its subscriber number is released, possibly after a period of time.

The invention also proposes a digital radio telephony system comprising a network having at least one call center and having portable terminals each of which stores identity data, a call number for a single center belonging to the network, and optionally an indication of an initial number of units that can be transmitted to the center.

Finally, the invention proposes a terminal that is usable in a system of the kind defined above, the terminal including a speech encoder/decoder connected to means for transmitting/receiving a carrier that is modulated by a speech signal, a preprogrammed memory that is not accessible for writing and that is protected for reading, the memory containing an identifier, means for making a call to a single call center having a predefined number that is stored, and for transmitting the identifier, optionally together with prerecorded credit, transmission being in secure form. It is nevertheless more convenient for the credit to be deducted by the network from the identifier that it receives. The identifier should comply with the standards of the radio network used, e.g. the 11 to 15 digit standard presently provided in GSM.

To reduce the cost of the terminal, it is possible to provide it with a single call button causing a link to be established with the call center by 'dialling' the number of the center, assuming that only outgoing calls are authorized. Nevertheless, it is preferable to provide one or more buttons enabling the terminal to be switched off, to be put on standby (to receive calls), to answer an incoming call, and to seize a line to make an outgoing call.

The screen usually provided on cellphones can be omitted, thereby also reducing cost. However a monochrome or a color liquid crystal screen can be maintained for the purpose of displaying prerecorded messages that are stationary or animated, including advertising messages or games, so as to create a collectible. However the screen is not intended to display telephone information.

The invention has numerous applications since various circumstances make it essential to have a mobile telephone even though a subscription is not otherwise justified or when the conditions required for obtaining a subscription are not satisfied (e.g. people away from home).

By way of non-limiting example, mention can be made of children on an occasional trip, in particular during school holidays, people having a bad credit rating, and managers working away from the office under circumstances where there is reason to fear that a conventional mobile telephone will break down, be stolen, be lost, or be forgotten.

The terminals can be sold in supermarkets or in tobacconists, for a prepaid amount which may be accompanied by the constraint of telephoning only from or only to the country of sale. To reduce the cost price of the terminal, its case may carry advertising with a contribution to costs coming from the advertiser.

The telephone number allocated to the purchaser is kept valid so long as a credit balance remains and/or so long as a term of validity has not expired, and it enables the purchaser to be called, including from abroad, via the network with which the telephone is associated. The terminal is generally not rechargeable so as to avoid risks of fraud.

The operating principle can implement means comparable to those used for phone cards and for GSM, but in highly simplified form, particularly in the most common circumstance of no recharging being provided for. Nevertheless, and this is an essential difference, the prepaid amount is debited by the network on the basis of the credit communicated by the call center. Terminals are invalidated after their credit has been used up and/or after their period of validity has expired, but they may optionally be collected so that various components thereof can be reused several times over, e.g. the vocoder and the high frequency head (as happens with so-called discardable cameras). Management at the call center and at the charging center is very simple and very flexible. The initial credit can be decremented progressively with the caller being informed of the balance by the call center each time a new call is made. Consumption can be determined as use takes place and compared with the initial credit. The option of receiving calls can be maintained by programming at the call center for a determined duration after credit has expired, possibly accompanied by a message indicating that credit has expired.

The initial operations of putting into service by allocating a number, and then of establishing a call can be performed by means of a voice server. Nevertheless, it is not always justifiable, these days, to make use of human operators.

The identifier can be implemented in a manner comparable with that used in GSM and can be calculated on the basis of a serial number, a manufacturer's number, etc. which numbers are inaccessible from the outside and are calculated by means of an algorithm such as the data encryption standard (DES), or the Rivest Shamir Adleman (RSA) algorithm, or an algorithm requiring zero knowledge input.

To simplify the terminal, it is preferable to avoid data transfer other than transfer of data required for initializing the terminal, for recognizing it, and for locating it within the cellular network.

The system can use the infrastructure of an existing cellular radio telephone network. This infrastructure generally includes fixed stations each allocated to a particular cell, and base station controllers which manage all of the cells in a determined region. The way in which a link is set up with the appropriate base station and at the initiative of a terminal of the invention can be the same as that used for conventional terminals, except that the call number authorized for the terminal is a single number and gives rise to routing to a single call center capable of accessing the general network. The call center includes access means, means for forwarding a call to the desired other party, and means for handling payment. The functions to be performed can be summarized as follows:

Distributed Telephone Management

Serial numbers or manufacturers' numbers of telephones (or some other identifier) are communicated to the call center either when the telephones enter the sales network, or else when they are sold. If this occurs on sale, the consequences of a batch of telephones ready for use being stolen on leaving the factory are minimized.

Various checking means can be used to reduce fraud. One consists in the call center recording the serial numbers or the manufacturers' numbers of all of the telephones that have been distributed (together with the prepaid amounts allocated thereto if they vary depending on the type of appliance). Once a first call has been made from a terminal, the call center identifies the terminal by data interchange implementing an enciphering algorithm that makes it impossible to recognize the number by eavesdropping the interchange. Subsequently, the balance can be checked by using the same means to verify that the amount taken into account and the amount which remains and which is indicated by the terminal are consistent, assuming that the terminal is capable of operating in this way.

Given that the sums of money involved remain small, simple algorithms with zero knowledge input can be used. Nevertheless, it is also possible to use more complex algorithms such as the DES or the RSA algorithms.

Handling Payment

Payments can be handled by an operator, which is the simplest solution to implement, or automatically by speech recognition and speech synthesis at the call center.

With an operator, when a call is set up, the operator can inform the proprietor of the terminal of the balance remaining. The operator engages the charging mechanism. The network will interrupt the call if the balance drops to zero, possibly after giving an audible warning, and the data relating to the terminal is deleted from the call center at the end of a predefined period of validity. At the end of a call, the balance is updated and can also be recorded in the terminal. It is transmitted to the caller by voice. Additional consistency checks can be implemented (consistency between the type of amount allocated and the destination of the call, . . . ). Rules can be provided for auditing the file. In particular, terminals can be sold with an indication of a period of validity beyond which the data relating to the terminal will be deleted from the call center. To prevent an out-of-date terminal being used for call attempts that will fail but that will nevertheless make use of resources in base stations, the terminal can be designed so that the transmitter means of the high frequency head can be disabled by an order issued from the network.

Call Management

On the first call (e.g. identified by the fact that no call number has yet been allocated to the identifier in a database), a number is allocated and is given to the purchaser by voice, and is memorized. Making calls from the center, when a request is received, is a conventional operation and is easily performed using human operators. It is easy to exchange information by voice, thereby making it pointless to provide the terminal with a display screen, thereby reducing cost, size, and power consumption.

It is also possible to use voice synthesis to inform the holder of the terminal and to use voice recognition to identify the number the holder wishes to call by spelling out the subscriber digits. Such a vocal server system can use means comparable to those already put into operation by France Télécom to provide information about what's on in various regions.

Call handling is simple when the terminals are sold with information that they are good for national calls only, and in a given language only. Nevertheless, the user may be given the option of using a language other than that of the country of sale, by implementing one or other of various solutions, e.g.:

- access to the call center of the country of sale followed by diversion to an operator speaking the selected language;
- direct selection of language by the purchaser when the discardable terminal is initialized; a program resident in the terminal is then provided to enable the purchaser to select a language and to allocate the access number for the center operating in the selected language to the call button provided on the terminal.

When calls are processed automatically, a single center may include means for analyzing and synthesizing speech in several languages.

Handling centralized in just one call center per country gives the advantage of centralizing all data in a single location in which credit is recorded and where debits are made.

In order to protect the environment, provision can be made to return a deposit and/or to reduce sale price in the event of a used appliance being handed in. Some of the components can be reused, with each use being indicated by a mention applied to the component so as to ensure that each component is eventually discarded after being used a given number of times. Power can be provided by electrochemical primary batteries or by solar cells. The use of rechargeable batteries is not justified given the short working life and the lack of means for reloading credit units.

There follows a description by way of non-limiting example of one possible structure for a mobile radio telephone terminal of the invention. The description refers to the accompanying drawing.

DETAILED DESCRIPTION

Figure 1:
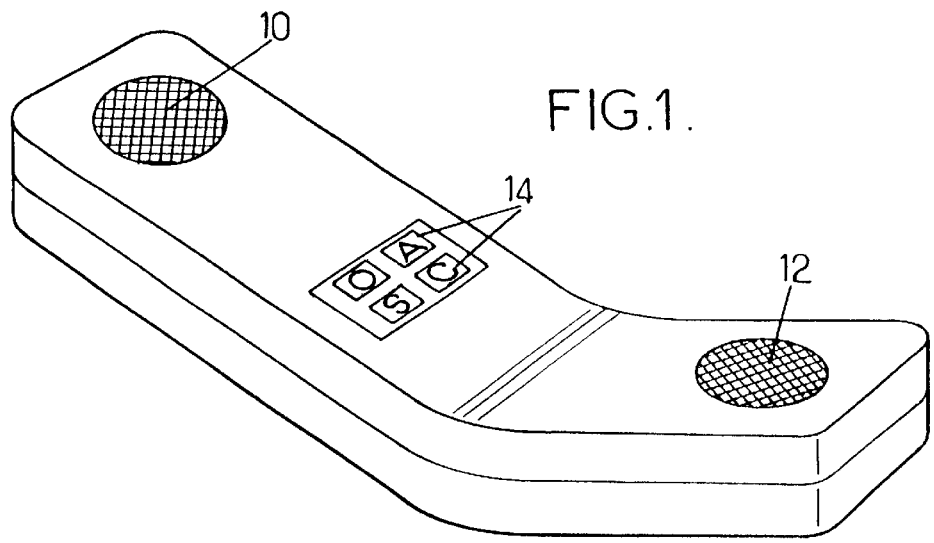
FIG. 1 is a perspective view of a terminal showing the components that appear on its front face.

The portable terminal shown in FIG. 1 comprises a case made of two parts that are snap-fastened or welded together. The front face has windows 10 for an earpiece and 12 for a microphone, together with a set of four buttons 14 designed so that only one of them can be depressed at a time so as to impart a well-determined state to the terminal. In other words, each depressed position of one of the buttons excludes any of the other buttons taking up a depressed position. Light emitting diodes (LEDs) 15 give essential information, e.g. the state of the terminal (transmit/receive or receive only). In FIG. 1, each button may include its own LED, e.g. seen through the button which is transparent.

Figure 2:
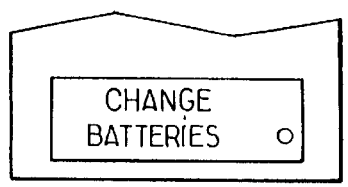
FIG. 2 shows one possible appearance of the bottom portion of the rear or front face, showing a battery level indicator.
Figure 4:
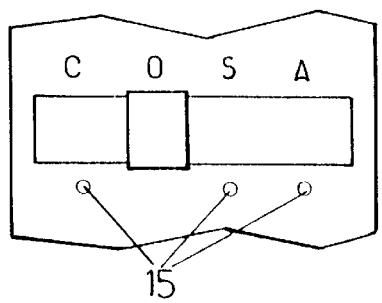
FIG. 4 shows another possible disposition for the switch means.

The rear face is provided with a flap enabling batteries to be installed and with a battery-receiving hatch. An LED placed in the back can show battery level (FIG. 2). Insufficient battery voltage can be indicated by a change in color or by flashing or by a sound signal. A large area can be left available for an advertising message. The serial number of the appliance that enables track to be kept of it may be printed or embossed on the rear face. It may include a serial number only, or else by a serial number followed by digits for verifying that it is authentic, e.g. if the serial number needs to be spoken by the user to an operator when the appliance is first put into service.

The terminal can be sold in a sealed transparent pack that may also contain the batteries.

A label may be provided so that the user can write thereon the temporary call number which is allocated when the terminal is put into service.

By way of example, the buttons may have the following functions:

Off O: when this button is depressed, power supply to the terminal is switched off; no transmission or reception is possible.

Standby S: this position allows calls to be received. In this state, a program periodically checks and memorizes whether the power supply is sufficient, turns on a voltage indicator and switches the terminal into receive mode, which may be the mode expected by the corresponding network. Under such circumstances, a field measurement sequence is performed automatically to seek the signal transmit and receive frequencies of a beacon channel to inform the appropriate station of the presence of the terminal, to perform signalling when a call is received, to select the conversation channel, and to provide a visible or an audible indication when a call is being received. The terminal can be designed to return to off mode after a certain length of time has elapsed in order to save batteries.

Answer A: this position enables the user to take the line, if the user so desires, on receiving warning of an incoming call. Actuating this button puts the vocoder module into operation.

Call C: this position enables a call to be made with automatic connection to the server center via the radio network. Again the program periodically checks that the power supply is sufficient and controls lighting of an indicator to specify that the appliance is powered and to switch the terminal into call transmit mode. By way of example, when the terminal is used in a GSM system, fields are measured to seek a transmit frequency, to seek a beacon channel for enabling the network to locate the terminal, for signalling (call transmission), for selecting the conversation channel, for transmitting the terminal identity sequence (to enable the server center to initialize account debiting or to refuse the call in the event of loss, theft, or exhaustion of credit), putting the transmit module and the vocoder module into operation. At system level, routing may take place automatically to a backup number for the server center if the server is busy.

Given that power is taken from batteries, which are of limited lifetime, it can be advantageous to use a transmit module whose power is adjustable and to adjust its power as a function of its closeness to a relay point, as determined by field measurements.

Figure 3:
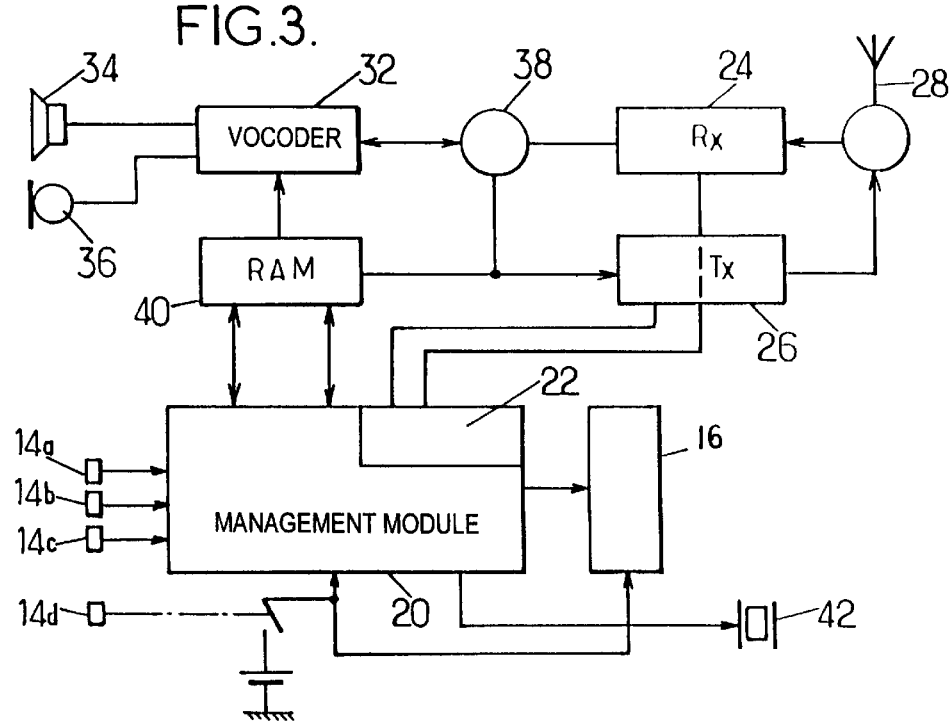
FIG. 3 is a block diagram.

The block diagram of the terminal may be as shown in FIG. 3. It comprises a management module 20 and a mobile network module 22 both of which may be integrated circuits as currently available on the market for GSM terminals or for simplified modules. The module is connected to a receiver 24 and to a transmitter 26, each of which comprises an amplifier and both of which are connected to an antenna 28. The antenna may be printed directly on the card which carries the integrated circuit. A vocoder 32 supplies the audio signal which is output to an earphone 34 and receives the audio signal for processing from a microphone 36. It is connected via a switching circuit 38 to the transmitter and to the receiver. The data required for operation is stored in a memory 40.

When it is desired to minimize cost (as is often the case), the terminal does not have means for transmitting and receiving data other than the data mentioned above, given that such means would put constraints on initializing the terminal on the first occasion it is put into service.

The management modules are connected to the standby button 14a, the call button 14b, the answer button 14c, and the off button 14d. The management module is also connected to a component 16 for giving warning of an incoming call, e.g. a ringer 42.

The system may be designed to reduce the risk of theft, or at least to make it less profitable. Two types of theft are to be feared, theft of an entire batch of telephones and snatch theft of a single telephone.

One measure consists in giving each terminal an identification number printed on the back that the purchaser must utter on making the first call. The number can be encoded by means of a secret key so that a number given at random will not satisfy the code and a number taken from another telephone will be identified as having been allocated already. Another solution consists in informing the distributor under separate cover of a word that the purchaser needs to utter.

An individual stolen telephone can be invalidated on a complaint being made by the legitimate holder thereof, merely by setting its account to zero.

What is claimed is:

1. For use in a digital radio telephony system comprising:
   a cellular telephony network having at least one call center; and
   a plurality of portable terminals each having memory means for storing terminal identity data,
   said call center including means for identifying portable terminals that have been sold or manufactured from the identity data thereof, means for managing payments by debiting an initial account allocated to each terminal, and means for managing and routing calls originating from said portable terminals,
   a portable terminal including a vocoder connected to transceiver means using a digitally modulated carrier for transmitting and receiving a speech signal, a memory preprogrammed and protected again writing, the memory containing said identifier, a call button for calling only said call center having a number that is predefined and stored in the terminal, said call button causing the number of the single call center to be transmitted, and means for sending the identifier to the call center.

2. A terminal according to claim 1, wherein said call button has only off, standby, and answer mode positions, in addition to a call position.

3. A method of digital radio telephony including the steps of:
   providing a system having a fixed network having at least one call center and a plurality of portable terminals each being devoid of calling means except means capable of calling only said call center;
   assigning a predetermined credit of telephone charging units to each of said portable terminals prior to sale of said terminals;
   when a first call is made from one said terminal to the call center, transmitting an identifier to the single call center from the terminal and transmitting a temporary subscriber number from the call center to the terminal responsive to said call, thereby enabling said terminal to be called via the network;
   storing said subscriber number at the call center; and
   on subsequent calls from said terminal to the call center, setting up the requested connection via the call center and debiting telephone charging units from the initially assigned charging units.

4. A method according to claim 3, wherein, responsive to the first call, the temporary subscriber number is given to the terminal by voice by voice synthesis and on each subsequent call, and on each subsequent call the holder of the portable terminal indicates the called number vocally, said number being identified by speech recognition at the call center.

5. A method according to claim 4, including the step of informing the holder of the portable terminal of the balance remaining from the call center by voice synthesis.

6. A method according to claim 3, wherein on the first call the call center records the temporary number; and when the credit has been used up, the call center invalidates the terminal.

7. A method according to claim 6, characterized in that during manufacture or sale, an identifier stored in the terminal is recorded at the call center, and in that on each occasion a call is made, a check is performed on said identifier.

8. A method according to claim 6 wherein after credit exhaustion, calls from the terminal are rejected by the network.

9. A method according to claim 8, characterized in that the possibility remains of receiving calls from the network during a determined period of time after the credit has been exhausted, after which time the terminal is invalidated and its subscriber number is released by the call center.

10. A method according to claim 6, wherein, in response to the first call, the temporary subscriber number is given to the terminal by voice synthesis.

11. A digital radio telephony system comprising:
    a cellular telephony network having at least one call center; and
    a plurality of portable terminals each having memory means for storing terminal identity data and a call number for a single said call center, and each devoid of calling means except means for transmitting said call member,
    said call center including means for identifying portable terminals that have been sold or manufactured from the identity data thereof, means for managing payments by debiting an initial account allocated to each terminal, and means for managing and routing calls originating from said portable terminals.

* * * * *